United States Patent [19]

Hartmann et al.

[11] 4,025,934
[45] May 24, 1977

[54] METHOD AND DEVICE FOR DETERMINING A VALUE CORRESPONDING TO THE NUMBER OF REVOLUTIONS OR THE ANGLE OF ROTATION OF AN AXLE

[75] Inventors: Georg Hartmann, Marloffstein; Adam Dittner, Hochstadt, both of Germany

[73] Assignee: Frieseke & Hopfner GmbH Erlangen-Bruck, Erlangen-Bruck, Germany

[22] Filed: Apr. 29, 1976

[21] Appl. No.: 681,757

[30] Foreign Application Priority Data

May 13, 1975 Germany ............... 2521163

[52] U.S. Cl. .................. 324/163; 324/118; 332/31 R
[51] Int. Cl.² ............ G01P 3/46; G01R 19/18
[58] Field of Search ......... 324/163, 118; 332/31 R, 332/2; 310/111; 84/1.28

[56] References Cited

UNITED STATES PATENTS

| 2,679,028 | 5/1954 | Otis et al. ............... | 324/118 X |
| 2,743,374 | 4/1956 | McCreary, Jr. ........... | 324/118 X |
| 3,858,109 | 12/1974 | Liden ..................... | 324/163 X |

*Primary Examiner*—Rudolph V. Rolinec
*Assistant Examiner*—Vincent J. Sunderdick
*Attorney, Agent, or Firm*—Toren, McGeady and Stanger

[57] ABSTRACT

A method and device is disclosed whereby the number of revolutions of an axle or the angle of rotation of an axle are represented by a particular value. The value is preferably in the form of an electric analog signal. A pickoff element having a linearly-shaped primary coil and a linearly-shaped secondary coil is disposed so that the primary and secondary coils are in parallel with an air gap therebetween. The air gap is for the formation of a homogeneous stray field. A metallic disc which has a rim in the form of an Archimedes' spiral, is affixed to an axle. The disc is disposed in the air gap between the primary and secondary coils. A high frequency signal is supplied to the primary coil. Accordingly, when the axis is rotated, an amplitude modulated signal is developed at the secondary coil. The amplitude modulated signal is then demodulated and subsequently differentiated to provide an analog signal proportional to the angular rotation of the axle or the number of revolutions of the axle. The disc is shown in two embodiments. One employs symmetrical Archimedes' spiral shapes and the second employs a single Archimedes' spiral having a discontinuity between the beginning and end of the spiral.

8 Claims, 2 Drawing Figures

4,025,934

METHOD AND DEVICE FOR DETERMINING A VALUE CORRESPONDING TO THE NUMBER OF REVOLUTIONS OR THE ANGLE OF ROTATION OF AN AXLE

FIELD OF THE INVENTION

The present invention relates to a method and an apparatus for determining a value corresponding to the number of revolutions or the angle of rotation of an axle and for providing this value in the form of an electrical analog output signal.

BACKGROUND OF THE INVENTION

There is a need for a method and apparatus which provides a signal corresponding to the number of revolutions of an axle. Such need requires that the signal is obtained in a contactless manner and causes little wear to the apparatus. It is also preferable if the apparatus is insensitive to contamination and humidity and can also respond to high accelerations and a high number of revolutions. Finally, there is a need that the apparatus should also respond to small angular increments as well as the number of revolutions of the axle. In any case, the apparatus should be easily and inexpensively manufactured.

It is an object of the present invention, therefore, to provide a method and apparatus which yields a value corresponding to the number of revolutions or the angle of rotation of an axle.

It is also an object of the present invention to provide such an apparatus in which the number of revolutions or angle of rotations is developed in a contactless manner and which apparatus is insensitive to contamination and humidity.

It is still a further object of the present invention to provide a method and device for yielding a signal corresponding to the number of revolutions or angle of rotation of an axle which can respond to high accelerations, a high number of revolutions, and is readily and inexpensively manufacturable.

SUMMARY OF THE PRESENT INVENTION

In accordance with the present invention a method for determining a revolution-related value, such as the number of revolutions or the rotational angle of an axle, wherein the value is provided in the form of an electrical analog signal, comprises the steps of supplying a high-frequency signal to a primary coil of a pickoff element having a linearly-shaped primary coil and a linearly-shaped secondary coil, wherein planes of the coils are parallel and with an air gap therebetween for the formation of a stray field, and disposing a metallic disc having rims in the form of an Archimedes'spiral in the air gap with a disc being affixed to the axle which is subject to rotation. Also included are the steps of rotating the axle so as to cause an amplitude modulated signal to be developed on the secondary coil, demodulating the amplitude modulated signal and differentiating the demodulated signal to develop an electrical analog signal proportional to the angular rotation or the number of revolutions of the axle carrying the metallic disc.

Also, in accordance with the invention, a device for determining a revolution related value, such as the number of revolutions or the rotational angle of an axle, comprises a rotatable axle, a pickoff element having a linearly-shaped primary coil and a linearly-shaped secondary coil, with the primary and secondary coils being disposed in parallel with an air gap therebetween. The air gap is for the formation of a homogeneous stray field. Also included is a metal disc having a rim in the form of an Archimedes'Spiral, which is affixed to the axle and is disposed in the air gap between the primary and secondary coils and means for supplying a signal, having a frequency relatively higher than the rotational speed of the axle, to the primary coil. Finally, included are a demodulator, coupled to the secondary coil and responsive to an amplitude modulated signal developed on the secondary coil when the axle is rotated, the demodulator for developing a demodulated signal, and a differentiator responsive to the demodulated signal for developing an analog signal which is proportional to the angular rotation of the axle or the number of revolutions of the axle.

For a better understanding of the present invention, together with other and further objects thereof, reference is made to the following descriptions and accompanying drawings, while the scope of the invention is pointed out in the appended claims.

DETAILED DESCRIPTION OF THE INVENTION

Figure 1:
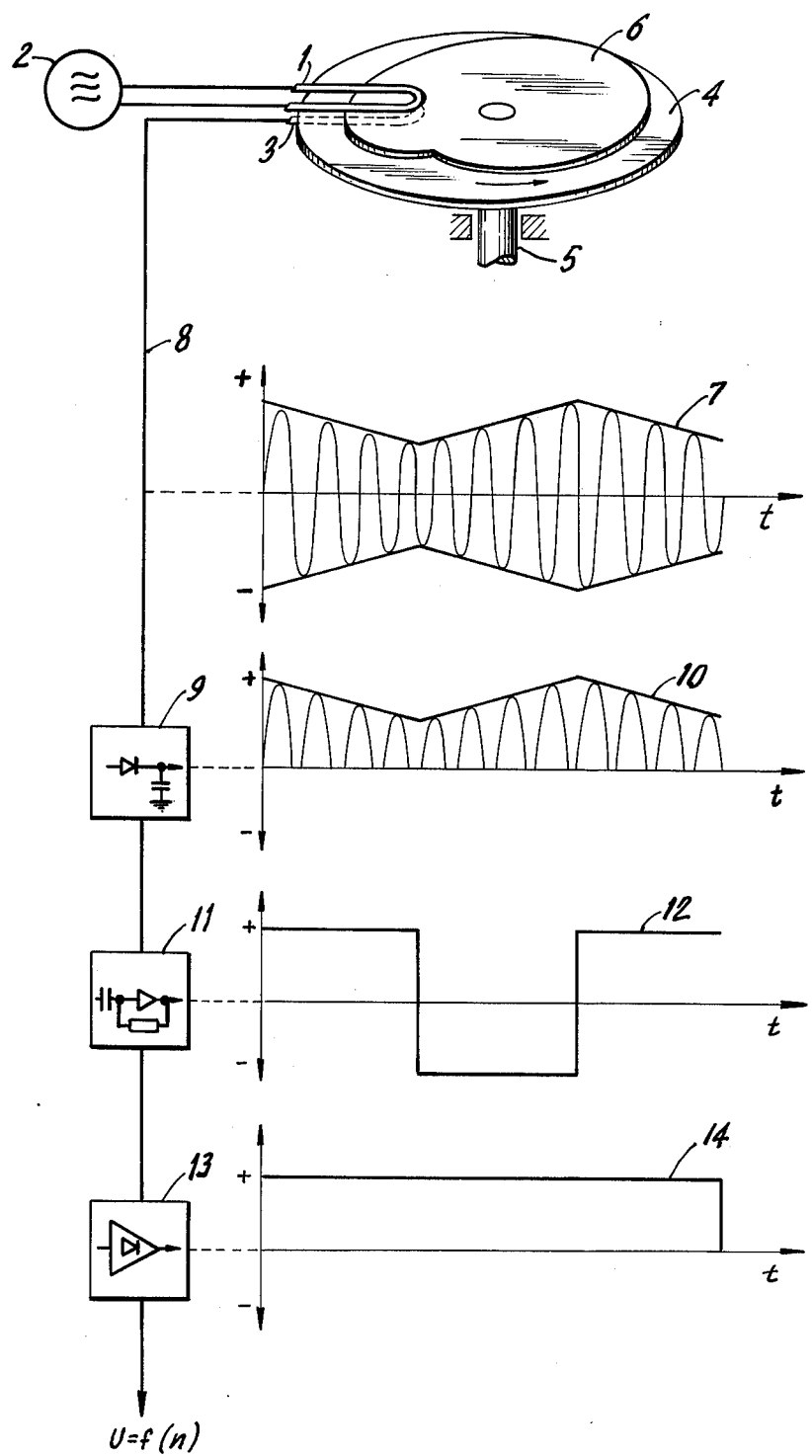
FIG. 1 illustrates a device in accordance with the present invention employing an Archimedes'spiral in the form of a heart-shaped curve. The figure also includes typical waveforms at various points in the processing of the signal.

Referring initially to FIG. 1, a pickoff element having a linear shaped primary coil designated as 1 and a linearly-shaped secondary coil designated as 3 are shown. The linearly primary and secondary coils are disposed parallel to each other with an air gap therebetween. A rotor 4 carrying a metallic disc 6 is disposed on an axle 5. The rotor with metallic disc moves in the air gap between the primary and secondary coils. The axle 5 represents the axle for which the number of revolutions or angle of rotation is to be determined. Connected to the primary coil 1 is a high-frequency energy source or generator 2. The frequency of the source is relatively higher than the rotational speed of the axle.

The rotor 4 may, for example, consist of a glass-fiber epoxy-resin disc which is attached or glued in a known manner to the metallic disc 6. Metallic disc 6 has a rim in the form of an Archimedes'spiral. In this particular embodiment, two portions of such a spiral are joined so as to form a heartshaped curve. As is well known, an Archimedes'spiral is characterized by an increase or decrease of its radius being proportional to the angle of rotation.

The linear coils 1 and 3 together form an air-coupled transformer. Upon excitation of the primary coil 1, a homogeneous stray field exists between the coils. Upon motion of the rotor 4, the coupling between the primary and secondary windings is changed in a linear manner with respect to the rotor's angular position. The output of the secondary winding is consequently amplitude-modulated thereby. The amplitude modulated signal appears on lead 8 and is shown as curve 7 in FIG. 1. As can be seen, the high-frequency carrier signal is linearly modulated in an increasing and decreasing manner.

Signal 7 is then provided to an amplitude demodulator 9. As is shown in pictorial form, the element may comprise a simple diode capacitor demodulator or a more sophisticated type demodulator, as is known. The output of the demodulator is shown as waveform 10 in FIG. 1.

The output of the demodulator is then supplied through a differentiator 11. As a result of the linear increase or decrease of the degree of modulation, curve 12 is obtained upon differentiation. As is evident, curve 12 is characterized by rectangularly shaped DC portions of equal areas but of different polarities.

It should be noted that curve 12 already provides an analog signal corresponding to the number of revolutions of the axis or shaft 5. It may be desired, for further subsequent processing, to have the signal fed to an active DC rectifier or unipolator device 13. Such device causes a polarity reversal of the negative voltage portions of the signal 12. The resultant signal is analog signal 14, a pure DC voltage.

It should be noted that the degree of coupling through the rotor 4 between coils 1 and 3 is independent of the number of revolutions of the rotor. The modulation frequency is, however, changed by the number of revolutions of the rotor. The modulation frequency is thus a linear replica of the number of revolutions of the axle 5, whereby the linearity of the modulation edges or the envelopes 7 and 10, remains preserved.

Thus, the faster the number of revolutions of the axle 5, the steeper are the modulation edges 7 and 10. This dependence on the number of revolutions is transformed by the differentiator 11 into appropriate amplitudes of the analog portion, the waveform 12. DC value 14, after passing the active DC rectifier 13, is consequently also a linear replica of the number of revolutions of the axle 5.

As may be understood from the above, axle 5 need not necessarily make a complete number of revolutions. Even a single angular rotation by, for example, 90° or a to-and-fro motion of the rotor 4, results in a DC voltage 14 or 12. The amplitude of the latter is constant as long as the angular rotation of the rotor 4, that rotation is not linear as a function of time, then there results in a corresponding change in the magnitude of signal 14. The aforesaid device is therefore suitable both for determining the number of revolutions or a change thereof as well as for determining the presence and/or non-linearity of a single angular rotation of the axle 5. The device according to FIG. 1 is useable in those cases where information with respect to the direction of rotation of the axle 5 is not required as, for example, in conventional motor drives.

Figure 2:
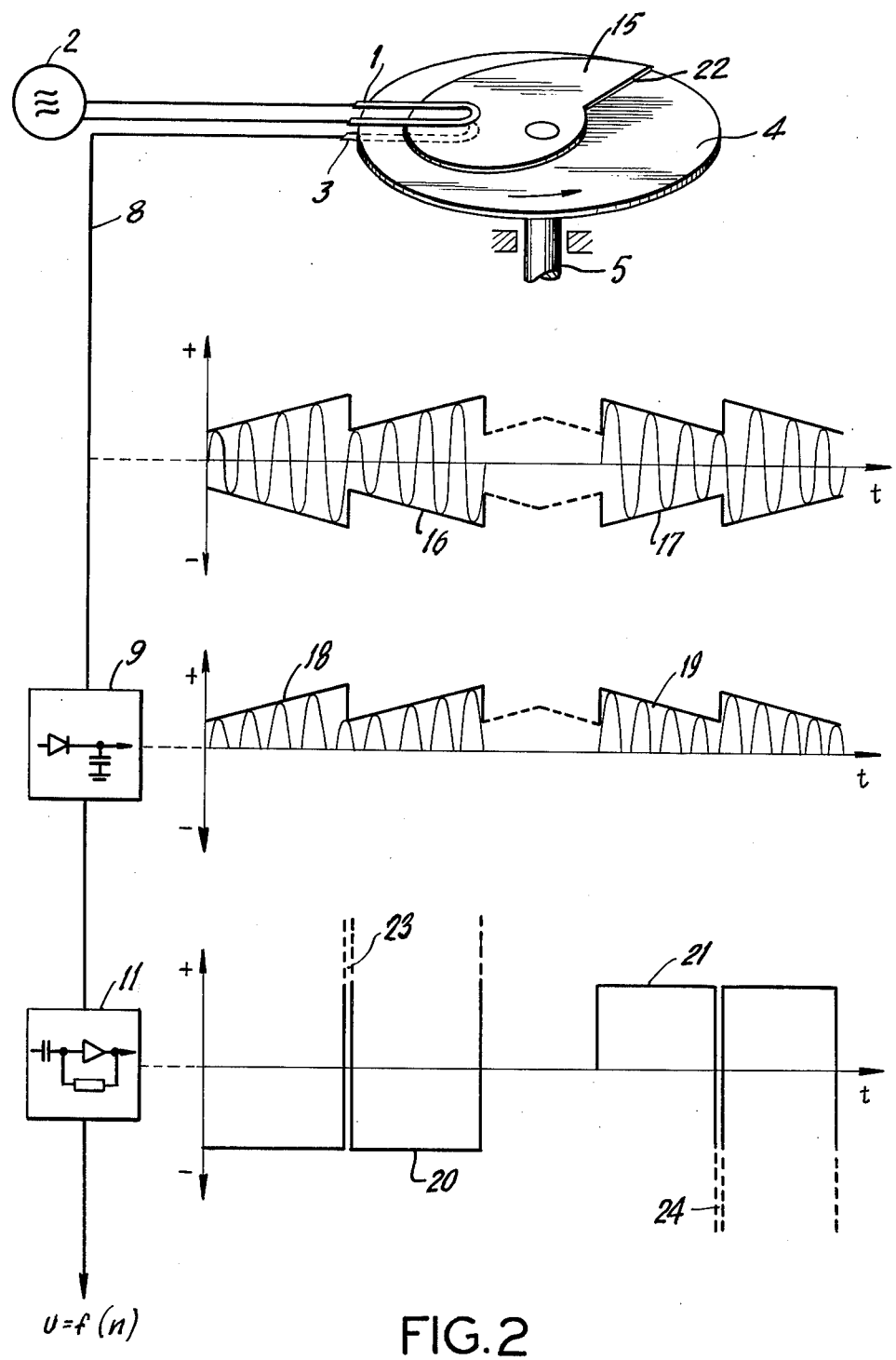
FIG. 2 illustrates a device in accordance with the present invention which employs an Archimedes'spiral extending over 360°.

If, however, an output signal is desired which is to provide information in dependence of the sense of rotation, then the device shown in FIG. 2 is advantageous. Here the metallic rotor is denoted by the numeral 15, the latter being again glued on, or attached onto an epoxy-resin disc 4. The rim of the disc is formed as an Archimedes'spiral extending over 360° with a tooth-shaped decrease of the radius. Note that the beginning and end of the curve is connected in discontinuous fashion.

If the disc now turns to the left according to the arrow shown, then a modulated waveform 16 is obtained on the lead 8. If, however, the disc 4 turns to the right, then the waveform 17 is obtained on the lead 8. Curves 18 and 19 result upon demodulation in the DC rectifier 9. The latter are further processed, as in FIG. 1, by the differentiator 11. One then obtains the voltage blocks or portions 20 and 21. As can be seen, the latter already contain the "sense-of-rotation"— dependent information by their respective signs.

If the radial edge 22 of the rotor 15 enters the stray field existing between the linear coils 1 and 3, voltage peaks 23 and 24 necessarily result which have a considerable amplitude. These may, however, be eliminated by simple and known electronic means, for example, by diodes of suitable polarity.

It should be noted that the device illustrated in FIGS. 1 and 2 operates more accurately when the geometry of the coils 1 and 3 approximates that of a line.

The metallic rotor discs 6 or 15 can be formed as an arbitrarily thin homogeneous metal part. It is also possible to use an appropriately etched plate or slab therefor, as shown in FIGS. 1 and 2. In both cases, a high number of revolutions as well as a high degree of acceleration is possible, as is already known, for example, in the case of disc-type rotor-generators. It will be apparent, that pressed-plate type rotors are particularly easily and inexpensively manufacturable, while having identically-remaining characteristics.

Since the law of induction does not apply when determining the number of revolutions, even very small angular rotations can be determined. As is easily ascertainable from the method of operation described, even quasi-static angular rotations of the axle 5 can be determined.

Even though no electrical output contacts whatever are required on the moving portion of the device, a pure DC voltage, or DC current is obtained as an output value having all the advantages which such DC currents provide in technical control applications.

Since magnetic stray fields, i.e. here the homogeneous stray field between the primary coil 1 and the secondary coil 3, are not influenced by usual contaminations, such as water, oil and dust, the present invention offers an unusual and extreme insensitivity ab initio with respect to such contaminations and humidity. Since both rotors 4 together with the added-on parts 6 or 15, as well as the transforming elements 9, 11 and 13, are manufacturable by simple press-molding techniques, a device according to the invention is manufacturable inexpensively. The manufactured device, however, is quite durable. The frequency of the generator 2 is basically not critical, because it does not enter, per se, into the measurement result. It is only necessary to insure that there is a relatively large number of direction changes of the high frequency supplying the primary coil, for each rotation of the rotor disc 4, so that a pulsation-free demodulation result is obtained by simple means from the output of the DC rectifier 9.

The lower the obtainable number of revolutions of the axle 5, or the rotational motion of that axis, the lower may be the selected frequency of the generator 2. In practice, frequencies from 10 kHz to 100 kHz have been adequate for most applications. Frequencies of this range are, as is known, very easy to generate and process by electronic means.

While the invention has been particularly shown and described with reference to the preferred embodiments thereof, it will be understood by those skilled in the art that various modifications and changes in form and detail may be made therein without departing from the true spirit and scope of the present invention.

What is claimed is:

1. A method for determining a revolution-related value, such as the number of revolutions or the rotatonal angle of an axle, said value being in the form of an electrical analog signal, said method comprisng the steps of:

supplying a high frequency signal to a primary coil of a pickoff element having a linearly-shaped primary coil and a linearly-shaped secondary coil, planes of said coils being parallel with an air gap therebetween for the formation of a stray field;

disposing a metallic disc having a rim in the form of an Archimedes'spiral in said air gap, said disc being affixed to said axle which is subject to rotation;

rotating the axle so as to cause an amplitude-modulated signal to be developed on said secondary coil;

demodulating said amplitude-modulated signal; and differentiating said demodulated signal to develop an electrical analog signal proportional to the angular rotation or the number of revolutions of the axle carrying the metallic disc.

2. The method of claim 1 also including the step of rectifying the differentiated output.

3. A device for determining a revolution-related value, such as the number of revolutions or the rotational angle, of an axle, comprising:

a rotatable axle;

a pickoff element having a linearly-shaped primary coil and a linearly-shaped secondary coil, said primary and secondary coils being disposed in parallel with an air gap therebetween said air gap for the formation of a homogeneous stray field;

a metallic disc, having a rim in the form of an Archimedes'spiral, being affixed to said axle and being disposed in said air gap between said primary and secondary coils;

means for supplying a signal, having a frequency relatively higher than the rotational speed of said axle to said primary coil;

a demodulator, coupled to said secondary coil and responsive to an amplitude-modulated signal developed on said secondary coil when said axle is rotated for developing a demodulated signal; and a differentiator responsive to said demodulated signal for developing an analog signal which is proportional to the angular rotation of the axle or the number of revolutions of the axle.

4. A device as in claim 3 wherein said rim has symmetrical Archimedes'spiral portions so as to form a heart shape.

5. A device as in claim 3 wherein said rim has a single Archimedes'spiral and a discontinuity connecting the beginning and end of the spiral.

6. A device as in claim 3 wherein said device includes a rectifier element responsive to said differentiator for developing a DC value corresponding to said axles rotation.

7. A device as in claim 3 wherein said metallic disc is affixed to a non-metallic carrier.

8. A device as in claim 3, wherein said carrier plate is a glass-fiber epoxy resin.

* * * * *